Patented May 23, 1950

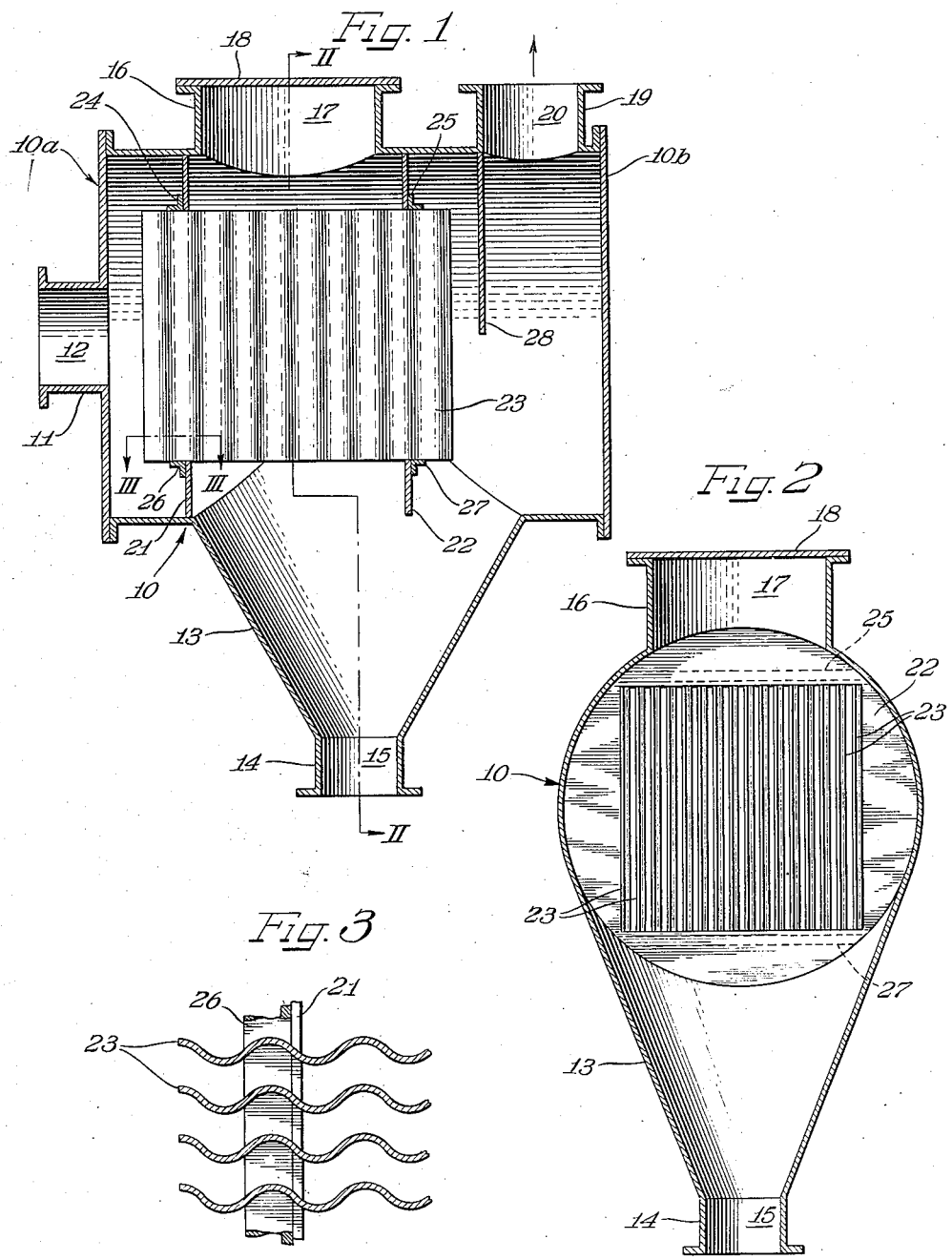

2,508,528

UNITED STATES PATENT OFFICE 2,508,528

FOAM SEPARATOR

John A. McPherson, Mosinee, Wis., assignor to Mosinee Paper Mills Company, Mosinee, Wis., a corporation of Wisconsin Application January 12, 1949, Serial No. 70,540

6 Claims. (Cl. 252—361)

This invention relates to an apparatus for destroying the foam in foaming liquids. More particularly, the invention describes an apparatus that effectively destroys foaming conditions in aqueous liquids which contain a large amount of dissolved or occluded gases.

The apparatus of the present invention is particularly suitable for use in the paper and pulp industry, where the disposition of the waste liquors from pulping processes, such as the sulfate process, has always presented a difficult problem. The presence of a large volume of gases in the waste liquor gives rise to the production of a foaming condition. This foaming condition must be broken for efficient operation of the pumps used in the disposal system.

An object of the present invention is to provide an apparatus for destroying the foaming condition in aqueous liquids containing a large proportion of dissolved or occluded gases.

A further object of the present invention is to provide an apparatus for destroying the foam, condensing and recovering the same.

A further object of the present invention is to provide a foam separator which is simple in construction and contains no moving parts, thus resulting in a saving of power over those types of apparatus which require rotating members to effect the collapse of foam bubbles in the liquid treated.

In general, the invention provides a foam separating apparatus comprising a tank which defines a chamber having an inlet for receiving the foaming liquid, an outlet for discharging the quiescent liquid from the tank, a vapor outlet for discharging released gases, and a series of spaced, corrugated baffles disposed in the tank for contacting the foaming liquid fed to the tank and destroying the foaming condition. The spaced corrugated baffles define tortuous paths for the foaming liquid in the passage of the liquid from the inlet to the liquid outlet. As the foaming liquid contacts the corrugated plates, the foam bubbles are broken down by the wiping action of the liquid against the surfaces. The breakdown of foam bubbles is also accomplished by the effect of the impact caused by the repeated change of direction through the tortuous paths which the liquid is caused to follow. Foam bubbles are also broken by virtue of the change in foam velocity as the liquid enters the unit from the inlet portion. The turbulence created in the foaming liquid as it passes around the corrugated surfaces insures that all foam bubbles are exposed to the wiping action of the corrugated surfaces. Baffle means are provided in the apparatus to minimize the amount of entrained liquid in the gases vented from the tank.

A further description of the present invention will be made in connection with the attached sheet of drawings, on which:

Figure 1 is a cross-sectional view of one form of the proposed apparatus with parts thereof in elevation;

Figure 2 is a cross-sectional view taken along the broken line II—II of Fig. 1; and Figure 3 is an enlarged cross-sectional view taken along the line III—III of Fig. 1.

As shown on the drawings:

Reference numeral 10 denotes a tank having a horizontally disposed, generally cylindrical body portion provided with circular end closures 10a and 10b. A horizontal flanged nipple 11 in one of the end closures 10a defines an inlet 12 for introducing the foaming liquid into the tank 10. The lower central portion of the tank 10 is formed into a frusto-conical sump 13 having a lower flanged nipple 14 which defines a discharge opening 15 for removing the defoamed liquid. At the top of the tank 10 a vertical flanged connection 16 defines a manhole 17, which is covered by a manhole cover 18. The manhole 17 is provided for access to the interior of the tank 10 to facilitate periodic cleaning. The top of the tank 10 is also provided with a second vertical flanged connection 19, which defines a discharge opening 20, for venting gases from the interior of the tank 10 to the atmosphere.

Disposed within the interior of the tank 10 are a plurality of circular supporting baffles 21 and 22 which extend the full transverse width of the tank 10. The supporting baffles 21 and 22 are suitably apertured for receiving a series of closely spaced corrugated baffles 23. Cross braces 24, 25, 26 and 27 provide additional support for the corrugated baffles 23 within the support baffles 21 and 22. The latter baffles serve to confine the flow of foaming liquid to the space between the corrugated baffles 23. The spacing between the individual baffles 23 is quite small, and may be on the order from about one-half inch to five inches. The baffles 23 are formed into a generally sinusoidal configuration in a horizontal plane and individual baffles 23 are disposed vertically in substantially parallel relation in the path of the liquid to be treated as it enters inlet 12.

To minimize the amount of liquid entrained in the exit gases, a vertical baffle 28 is provided in the interior of the tank 10 between the corrugated baffles 23 and the discharge opening 20 of the assembly.

In operation, the foaming liquor is continuously pumped into the inlet 12 of the tank 10, and passes through the spaces between the individual corrugated baffles 23. As previously mentioned, the passage of the liquid through the spaces provided between the baffles 23 creates frictional effects and turbulence which serves to rupture the bubbles present and thereby condense the foam. The condensed foam, together with the remainder of the aqueous solution, flows downwardly through the tank 10 and is continuously removed through the discharge opening 15. The liberated gases are vented to the atmosphere through the vapor outlet 20. As a gas pressure is built up within the interior of tank 10, the gases tend to trap a substantial amount of moisture particles. To minimize the amount of entrained moisture leaving the exit gases, the transverse vertical baffle 28 is provided between the series of corrugated baffles 23 and the gas discharge outlet 20. As the vapors containing the entrained moisture are impinged against the baffle 28, the moisture particles tend to collect on the surface of the baffle 28 and subsequently flow down into the sump 13 to the liquid discharge 15. The gases then pass under the lowermost portion of baffle 28 and are vented through the gas outlet 20. The baffle 28 also defines an auxiliary liquid vapor separating chamber below the vapor outlet 20 for effecting further separation of liquid and collapsed foam from the vapors.

It may be seen from the foregoing that I have herein provided a foam separator of a relatively simple design and free from mechanical difficulties. The separator herein described destroys foaming as well as many of the more complex devices which utilize rotating screens.

It is evident that many modifications may be made through a wide range without departing from the principles of this invention, and it is therefore not the purpose to limit the patent hereon granted otherwise than necessitated by the scope of the appended claims.

I claim as my invention:

1. A foam separating apparatus comprising a tank defining a chamber, an inlet for supplying a foaming liquid into said chamber, an outlet disposed below said inlet for discharging liquid from said chamber, a second outlet disposed above and spaced horizontally from said inlet for discharging vapors from said chamber, a plurality of spaced, corrugated baffles disposed in said chamber in the path of liquid flowing between said inlet and said vapor discharge outlet and spaced horizontally from both said inlet and said vapor outlet for collapsing foam bubbles in said foaming liquid passing between said baffles and means for securing said baffles in said chamber in the space between said inlet and said second outlet.

2. A foam separating apparatus comprising a tank defining a chamber, an inlet for supplying foaming liquid into said chamber, an outlet disposed below said inlet for discharging liquid from said chamber, a second outlet disposed above and spaced horizontally from said inlet for discharging vapors from said chamber, a plurality of spaced corrugated baffles disposed horizontally between said inlet and said vapor outlet in the path of liquid flowing into said chamber for collapsing foam bubbles in said liquid, means for securing said baffles in said chamber in the space between said inlet and said vapor outlet, and a transverse dependent baffle positioned between one end of said corrugated baffles and said vapor outlet for obstructing the direct flow of vapors from said corrugated baffle to said vapor outlet.

3. A foam separating apparatus comprising a tank defining a chamber, an inlet for supplying foaming liquid into said chamber, an outlet disposed below said inlet for discharging liquid from said chamber, a second outlet disposed above and spaced horizontally from said chamber, a plurality of spaced, corrugated baffles disposed horizontally between said inlet and said second outlet and above said liquid outlet in the path of foaming liquid flowing through said chamber for collapsing foam bubbles in said liquid, means for supporting said baffles in said chamber in the space between said inlet and said vapor outlet, and a transverse baffle disposed vertically between said corrugated baffles and said vapor outlet for obstructing the direct flow of vapors from said corrugated baffles to said vapor outlet.

4. A foam separating apparatus comprising a tank defining a generally cylindrical chamber having its axis horizontally disposed, an end inlet for the passage of a foaming liquid into said chamber, a lower outlet for discharging liquid from said chamber, an upper outlet disposed vertically above and offset horizontally from said inlet for venting vapors from said chamber, a plurality of vertically arranged corrugated plates, supporting means securing said plates within said chamber spaced horizontally between said inlet and said liquid outlet, said plate supporting means cooperating with said plates to define tortuous paths for liquid flowing from said inlet through said chamber, and a dependent baffle disposed in said chamber between said plates and said vapor outlet for diverting vapors flowing from said path downwardly before being vented through said vapor outlet.

5. A foam separating apparatus comprising a tank defining a chamber, an inlet for receiving a foaming liquid into said chamber, an outlet disposed below said inlet for discharging liquid from said chamber, an outlet in said chamber disposed above and offset horizontally from said inlet for venting vapors from said chamber, a plurality of baffles extending the transverse width of said chamber, a plurality of spaced corrugated plates held within said baffles spaced horizontally between said inlet and said vapor outlet, and a vertical baffle disposed in said chamber between said plates and said vapor outlet for diverting vapors flowing between said plates downwardly before being vented through said vapor outlet.

6. A foam separating apparatus comprising a tank defining a generally cylindrical main chamber with its axis disposed horizontally and a lower communicating sump chamber, an end inlet for introducing a foaming liquid into said main chamber, an upper vapor outlet adjacent the other end of said chamber, a lower liquid discharge outlet from said sump chamber, a plurality of spaced corrugated plates, supporting members mounting said plates in said main chamber in spaced horizontal relation between said inlet and said vapor outlet and confining the flow of said foaming liquid to the spaces between said baffles, and a vertically dependent baffle ahead of said vapor outlet and terminating above said sump chamber for aiding in the further separation of liquid and vapors as the latter flow past the lower end of said baffle and upwardly into said vapor outlet.

JOHN A. McPHERSON,

REFERENCES CITED

The following references are of record in the file of this patent:

UNITED STATES PATENTS

| Number | Name | Date |
|---|---|---|
| 1,376,073 | Borcherdt | Apr. 26, 1921 |
| 1,389,101 | Ohrvall | Aug. 30, 1921 |
| 1,553,973 | Ballou | Sept. 15, 1925 |
| 1,859,827 | Jacobsen | May 24, 1932 |